(12) United States Patent
Daughrity et al.

(10) Patent No.: US 12,142,743 B2
(45) Date of Patent: *Nov. 12, 2024

(54) ASSEMBLY WITH ELECTRICAL CONNECTION THROUGH ELASTOMERIC GASKET

(71) Applicant: Dana Automotive Systems Group, LLC, Maumee, OH (US)

(72) Inventors: Timothy W. Daughrity, Murray, KY (US); Christopher M. Cook, McKenzie, TN (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 332 days.

This patent is subject to a terminal disclaimer.

(21) Appl. No.: 17/446,709

(22) Filed: Sep. 1, 2021

(65) Prior Publication Data

US 2022/0085433 A1 Mar. 17, 2022

Related U.S. Application Data

(60) Provisional application No. 63/079,359, filed on Sep. 16, 2020.

(51) Int. Cl.
*H01M 10/615* (2014.01)
*B60L 50/64* (2019.01)
(Continued)

(52) U.S. Cl.
CPC ........... *H01M 10/615* (2015.04); *B60L 50/64* (2019.02); *B60L 58/27* (2019.02); *B60R 16/02* (2013.01); *F16J 15/022* (2013.01); *H01M 10/613* (2015.04); *H01M 10/6567* (2015.04); *H01R 13/5202* (2013.01); *H01R 2201/26* (2013.01)

(58) Field of Classification Search
CPC ........... H01M 10/615; H01M 10/6567; H01M 10/613; B60L 58/27; B60L 50/64; B60R 16/02; F16J 15/022; H01R 13/5202; H01R 2201/26
See application file for complete search history.

(56) References Cited

U.S. PATENT DOCUMENTS

| 5,035,637 | A | 7/1991 | Mathews et al. |
| 8,315,040 | B2 | 11/2012 | Roberts et al. |

(Continued)

FOREIGN PATENT DOCUMENTS

| GB | 2385665 A | 8/2003 |
| JP | 2019207296 A | 12/2019 |
| KR | 20030085712 A | 11/2003 |

OTHER PUBLICATIONS

Daughrity, T. et al., "Electric Vehicle Battery Coolant Heater Assembly With Electrical Connection Through Gasket," U.S. Appl. No. 16/921,792, 24 pages.

*Primary Examiner* — Alexander Usyatinsky
(74) *Attorney, Agent, or Firm* — McCoy Russell LLP (57) ABSTRACT

A gasket with at least one integral electrical connector adapted for an assembly includes an elastomeric gasket main body adapted to seal a joint between one or more assembly components and a cover, and at least one electrical connector extending through and formed integrally with the elastomeric gasket main body so as to provide power or electric signals to at least one electrical component of the assembly.

18 Claims, 3 Drawing Sheets

(51) Int. Cl.
*B60L 58/27* (2019.01)
*B60R 16/02* (2006.01)
*F16J 15/02* (2006.01)
*H01M 10/613* (2014.01)
*H01M 10/6567* (2014.01)
*H01R 13/52* (2006.01)

(56) References Cited

U.S. PATENT DOCUMENTS

| | | | |
|---|---|---|---|
| 9,324,980 B1 | 4/2016 | Goulden et al. | |
| 2004/0253867 A1* | 12/2004 | Matsumoto | H01H 13/81 439/500 |
| 2005/0014408 A1* | 1/2005 | Swiatek | H01R 31/06 439/215 |
| 2012/0183823 A1* | 7/2012 | Von Borck | H01M 10/663 429/81 |
| 2012/0315801 A1* | 12/2012 | Kwasny | B60L 53/16 439/695 |
| 2013/0066514 A1* | 3/2013 | Das | G07C 5/008 701/31.5 |
| 2019/0058227 A1* | 2/2019 | Thomas | H01M 10/6551 |

\* cited by examiner

ASSEMBLY WITH ELECTRICAL CONNECTION THROUGH ELASTOMERIC GASKET

CROSS-REFERENCE TO RELATED APPLICATIONS

This application claims priority to U.S. Provisional Application No. 63/079,359, filed Sep. 16, 2020, and titled "ASSEMBLY WITH ELECTRICAL CONNECTION THROUGH ELASTOMERIC GASKET," the entire contents of which are hereby incorporated by reference for all purposes.

TECHNICAL FIELD

The present disclosure relates to electric vehicle (EV) component assemblies and electrical connections therefor, and, more particularly, to methods and systems for an EV assembly with electrical connections through a component gasket.

BACKGROUND AND SUMMARY

Certain vehicle assemblies, such as a battery coolant heater, include an electric component (e.g., an electric heating element) housed in a housing that includes a cover. Current component wiring solutions for providing electrical power to the electric component include a separate harness plug installed on the cover. The harness plug (or harness connector) is installed in a hole in the cover, and wiring extends through the hole into the enclosed space within the housing to provide electric power to the electric component. The cover includes enough depth to accommodate both the harness connector dimensions and enough additional wiring length to allow threading the wiring through the hole in the cover, securely and sealably installing the connector within the cover through hole, extending the wiring toward the electric component for electrically connecting/powering the electric component, and, finally, closing the cover over the housing. However, the inventors herein have recognized that this configuration has disadvantages. The cover depth creates additional (unnecessarily large) packaging requirements. The harness connector cover through hole creates an additional leak path (into an otherwise sealed enclosure). Further, the configuration is difficult to assemble, requiring additional and awkward steps, for example, having to thread wiring through the cover and either bringing the cover and connector wiring close enough to the electric component for electrically connecting the component, or bringing the component close enough toward the cover and connector wiring to electrically connect the component, before enclosing the cover over the component and any other components housed in the housing (e.g., a coolant manifold).

To address at least some of the aforementioned and other problems, embodiments for a gasket with at least one integral electrical connector adapted for an assembly is provided. In an example, the gasket includes an elastomeric gasket main body adapted to seal a joint between one or more assembly components and a cover, and at least one electrical connector extending through and formed integrally with the elastomeric gasket main body so as to provide power or electric signals to at least one electrical component of the assembly.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to limit the scope of the present disclosure in any way.

Similar reference numerals may have been used in different figures to denote similar components. FIGS. 1-6 are shown with components in proportional size with one another, according to some embodiments.

DETAILED DESCRIPTION

It is to be understood that the invention may assume various alternative orientations and step sequences, except where expressly specified to the contrary. It is also to be understood that the specific assemblies and systems illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

As explained previously, some vehicle assemblies may include component covers that include a separate harness plug and associated wiring to provide electricity to one or more electric components housed in an enclosure covered by the cover. For example, electric vehicles and electric hybrid vehicles make use of batteries that are sensitive to temperature. To maintain the batteries at optimum temperatures, battery cooling plates are used, which are in thermal contact with the battery pack and incorporate fluid paths through which coolant is directed. The battery cooling system typically includes a coolant pump for moving coolant through the battery cooling plates, a chiller for reducing the temperature of the coolant fluid when needed, and a battery coolant heater for increasing the temperature of the coolant fluid to improve battery life. Each of these components includes coolant flow paths and electrical connections, and the components are typically positioned and configured within a particular vehicle according to specific space (or packaging) and thermal management requirements for the battery cooling system that depend on the specific geometries for a particular vehicle.

The battery coolant heater includes a coolant manifold through which the coolant fluid flows, an electric heating element, and a cover. Current component wiring solutions for providing electrical power to the heating element require a separate harness plug installed on the battery coolant heater cover. The harness plug (or harness connector) is installed in a hole in the cover, and wiring extends through the hole into the enclosed space to provide electric power to the heating element. The cover includes enough depth to accommodate both the harness connector dimensions and enough additional wiring length to allow threading the wiring through the hole in the cover, securably and sealably installing the connector within the cover through hole, extending the wiring toward the heating element for electrically connecting/powering the heating element, and, finally, closing the cover over the coolant manifold. As explained above, this configuration of a cover including a separate harness connector results in an unnecessarily large packaging requirement due to the high cover depth, and also presents an additional leak path via the through hole in the cover.

Thus, according to embodiments disclosed herein, the harness connector/plug and associated wiring on the cover may be eliminated by including a gasket comprised of an elastomer, with or without compression limiters, with an integrated external harness connector that passes power or signal directly through the elastomer. The pass-through circuitry may include a copy of any desired male electrical connector shroud integrally molded into it (defined by demanded mating harness connection and/or electrical requirements) with metallic pin circuitry or conductors configured to mate with the customer harness connection and complete the circuit to the power/signal requiring component. Final connection to the component may be made before cover installation. This gasket will seal the joint created by the cover required for component protection and the substrate that the component is attached to.

Figure 1:
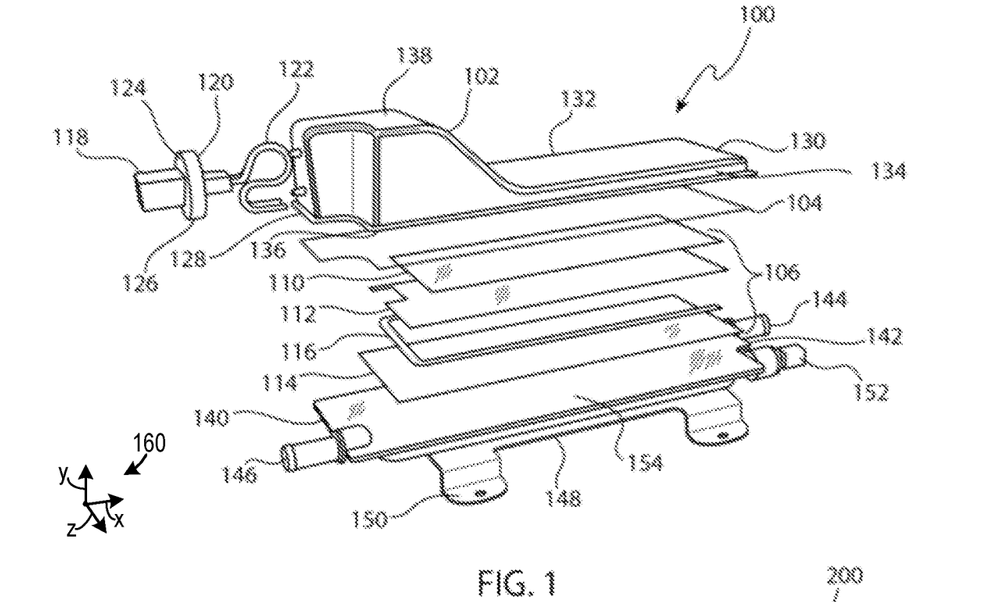
FIG. 1 is an exploded perspective view of an exemplary electric vehicle battery coolant heater assembly comprising components according to various embodiments.
Figure 2:
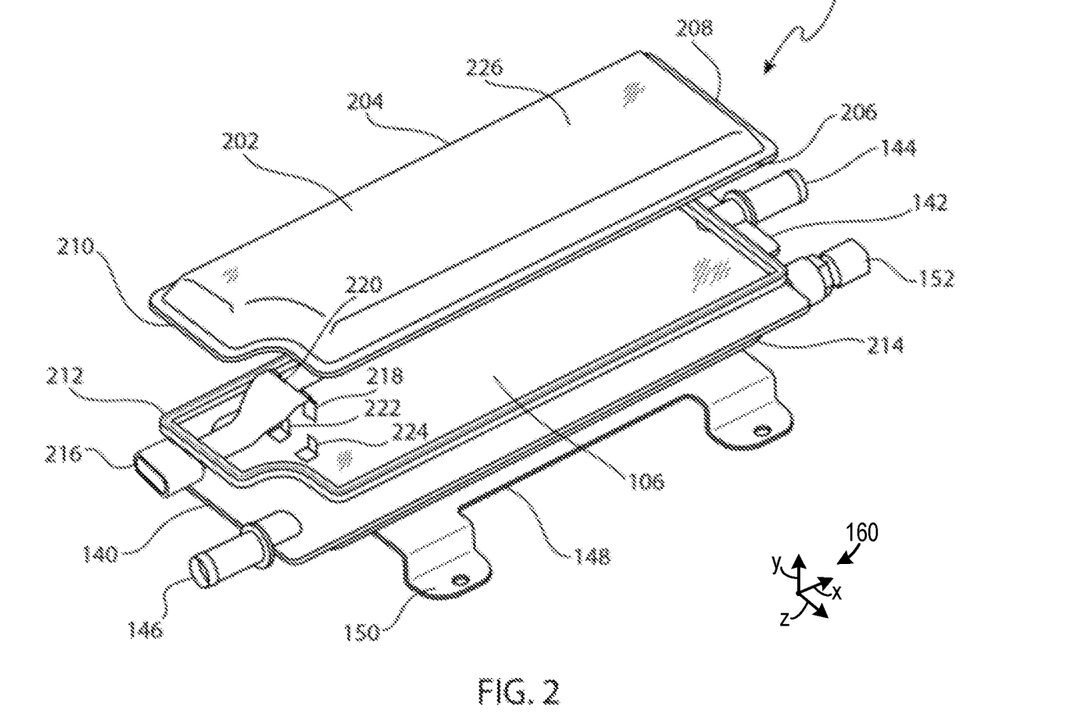
FIG. 2 is an exploded perspective view of an exemplary electric vehicle battery coolant heater assembly comprising a reduced height (depth) cover and sealing gasket with integral pass-through electrical connections, according to various embodiments.

As an overview, FIG. 1 illustrates an exemplary electric vehicle battery coolant heater assembly comprising a component cover, an electrical component (e.g., at least one heating element), a battery coolant manifold, and a gasket, wherein the cover includes a through hole with separate harness connector and lengths of wiring for electrical connection with the electrical component. FIG. 2 illustrates an exemplary electric vehicle battery heater assembly comprising a substantially depth reduced (height reduced) cover and a gasket having integral pass-through electrical connections. FIGS. 3-6 illustrate a gasket a gasket having integral pass-through electrical connections that may be incorporated into the assembly of FIG. 2 or another suitable assembly. A Cartesian coordinate system 160 is included in each of FIGS. 1-6.

Although the embodiments may be described in detail in the context of an electric vehicle battery coolant heater assembly, various embodiments and/or various aspects of the embodiments described may be separable and may be applied in other electric vehicle components, other vehicle components for non-electric vehicles, or other components for non-automotive applications. For example, aspects of the embodiments described, or aspects of portions of those embodiments, may be applied to a component having an electrical component sealably enclosed between a cover and a component mounting/attachment substrate (to which the electrical component is mounted/attached), with a power/signal pass-through configuration that is integrated into the sealing gasket between the cover and component/attachment substrate. As another example, aspects of the embodiments described, such as the substantially planar cover opening with correspondingly substantially planar sealing gasket and substantially planar component mounting/attachment substrate surfaces (arranged in parallel to one another), may be formed with different geometries. For example, the cover opening, gasket, and component mounting/attachment substrate may not be substantially planar (as shown and described) but may, instead, comprise matingly corresponding non-planar shapes that are configured to sealably attach to one another to provide a sealable enclosure for the enclosed electrical component.

The exploded perspective view shown in FIG. 1 is that of an exemplary electric vehicle battery coolant heater assembly 100 comprising components according to various embodiments. As shown, the battery coolant heater assembly 100 comprises a component cover 102 that extends lengthwise between an end 128 and an opposite end 130, and widthwise between an edge 132 and an opposite edge 134, and depth-wise between a lower edge 136 and a top surface 138. In one embodiment, the edges 134 and 132 extending between ends 128 and 130 define a substantially planar opening sized and configured to receive a correspondingly sized gasket 104 for sealing the cover 102 to correspondingly sized substrate gasket mounting surfaces of a component mounting/attachment substrate or, as shown, coolant manifold 108. The coolant manifold 108 preferably comprises a substantially planar heat transfer surface 154 that extends lengthwise within an area between an end 140 and an opposite end 142, and widthwise between edges corresponding with edges 134 and 132.

The cover 102, as shown, includes a depth (or height) between lower edge 136 and top surface 138 that is no less than the depth-wise dimension 126-124 of a separate harness connector 118. The depth-wise dimension 126-124 of the separate harness connector 118 extends from a lower end 126 to an upper end 124. The harness connector 118 includes a harness connector gasket 120 and a length of wire 122 extending from the harness connector gasket 120.

The length of wire 122 is shown in FIG. 1 in an S-shaped configuration, which is a collapsed configuration of the length of wire 122 when positioned within the portion of the cover 102 having the depth (height) between lower edge 136 and top surface 138. When the separate harness connector 118 and the length of wire 122 extending therefrom is inserted into a through hole in the cover 102 (shown in the side wall just above the end 128 of the cover 102), the length of wire 122 is of sufficient length to be pulled through the through hole and downward from the opening of the cover (between ends 128 and 130, and edges 134 and 132) so as to electrically connect with electrical connections 116 associated with the electrical component 106. Once the cover 102 is sealably engaged with gasket 104 and correspondingly mating surfaces of the coolant manifold 108, the length of wire 122 is forced to fold up (collapse) into the depth (height) 136-138 area of the cover 102. The depth (height) 136-138 of the cover 102 is, as shown, sufficient so as to accommodate the length of wire 122 needed for the manufacturing steps needed to pull the length of wire 122 through the through hole in the cover 102, insert the separate harness connector 118 to the cover 102, make the electrical connections to the electrical component 106, and place the gasket 104 between corresponding edges/surfaces of the cover and coolant manifold.

The electrical component 106 preferably comprises one or more heating elements, and the one or more heating elements may comprise various layers 114, 112, 110 and associated electrical circuitry and connections 116. In various embodiments, the electrical component 106 comprises at least one heating element adapted to contact a heat transfer surface 154 of the coolant manifold 108. In one embodiment, the at least one heating element comprises a substantially planar component that is sized and configured to be thermally coupled to the heat transfer surface 154. In one embodiment, the layers and components 110, 112, 114, and 116 combine to form at least one heating element comprising the electrical component 106.

The coolant manifold 108, as shown, comprises coolant flow ports 146 and 144 for receiving coolant fluid (heating fluid) into fluid paths within the manifold and exhausting coolant fluid into the electric vehicle battery coolant system (not shown). An auxiliary port 152 may be provided, which may be used for draining the coolant manifold (for example, during maintenance) or for charging (introducing coolant) or for bleeding air from the manifold and/or battery coolant system. Also as shown in FIG. 1, the coolant manifold may comprise a mounting plate 148 which may incorporate one or more mounting standoffs 150. The mounting plate 148, for purposes of describing a total height (the depth-wise dimension of the assembled battery coolant heater assembly 100), is shown forming the (substantially planar, excluding the standoff tabs 150) bottom surface of the assembly 100, with the total height (depth) of the assembly 100 extending between the bottom surface (e.g., mounting surface 148) and the top surface 138.

Turning now to FIG. 2 is an exploded perspective view of an exemplary electric vehicle battery coolant heater assembly 200 comprising a significantly reduced height (depth) cover 202 (as compared to the cover 102 shown in FIG. 1) and sealing gasket 212 with integral pass-through electrical connections, according to various embodiments. As shown, the battery coolant heater assembly 200 comprises a component cover 202 that extends between a lengthwise end 210 and an opposite end 208, and widthwise between an edge 206 and 204, and depth-wise between a lower edge 206 and an upper (top) surface 226. In one embodiment, the edges 206 and 204 extending between ends 210 and 208 define a substantially planar opening sized and configured to receive a correspondingly sized gasket 212 for sealing the cover 202 to correspondingly sized substrate gasket mounting surfaces of a component mounting/attachment substrate, or, as shown, coolant manifold 214. The coolant manifold 214 preferably comprises a substantially planar heat transfer surface as shown in FIG. 1, that extends lengthwise within an area between an end 140 and an opposite end 142, and widthwise between edges corresponding with cover edges 206 and 204.

The cover 202, as shown in FIG. 2, is free from any through hole sized and adapted to receive a non-gasket-integral electrical harness connector, such as the separate harness connector 118, shown in FIG. 1. The cover 202, as shown in FIG. 2, includes a depth (or height) between lower edge 206 and top surface 226 that is decreased by at least a portion of the depth-wise dimension 126-124 of the non-gasket-integral (separate harness) connector 118 shown in FIG. 1. In one embodiment, the cover 202 comprises a depth (height) that is reduced by an amount no less than the depth-wise dimension 126-124 of the separate harness connector, or no less than the depth-wise dimension 126-124 plus enough space to accommodate the extra wiring 122 associated with manufacturing requirements for assembly of a cover having a separate harness connector installed in a through hole in the cover.

The gasket 212 may comprise a molded or formed material sized and adapted to permit sealably enclosing the cover 202 and corresponding surfaces of the component mounting/attachment substrate, or coolant manifold 214. The gasket 212 may comprise a molded-in integral connector or molded-in harness mating connector shroud 216 having electrical conductors that extend from within the molded-in connector shroud 216 through the sealing portion of the gasket and continuing into the space enclosed by the cover and component mounting/attachment substrate or coolant manifold 214.

As shown in FIG. 2, electrical connections from the molded-in gasket-integral connector include pins 220 and 218, which press-fit to electrically connect with corresponding electrical connection pins 222 and 224, respectively, of the electrical component 106 (shown contacted to the heat transfer surface, such as heat transfer surface 154, of the coolant manifold 214).

Figure 3:
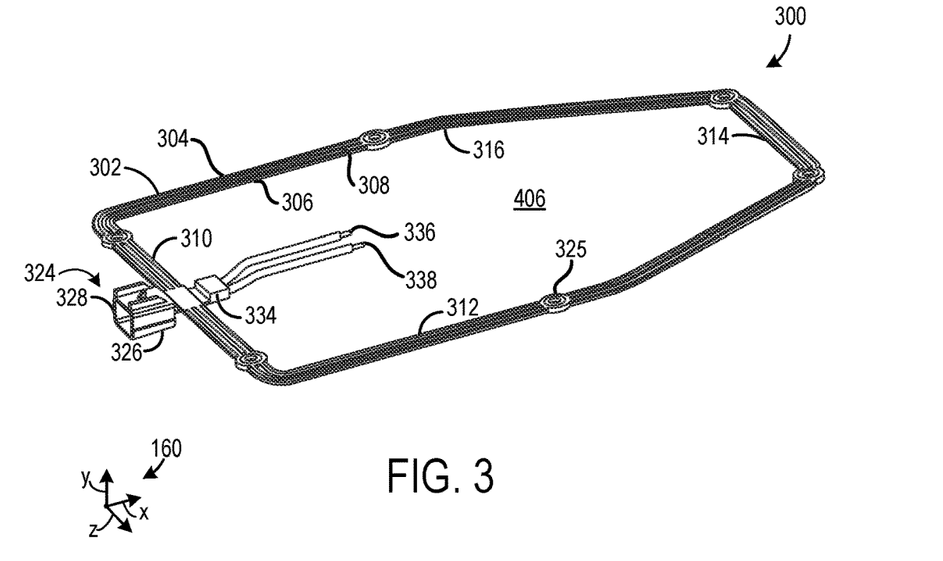
FIG. 3 is a perspective view of an exemplary gasket with integral pass-through electrical connections, according to various embodiments.
Figure 4:
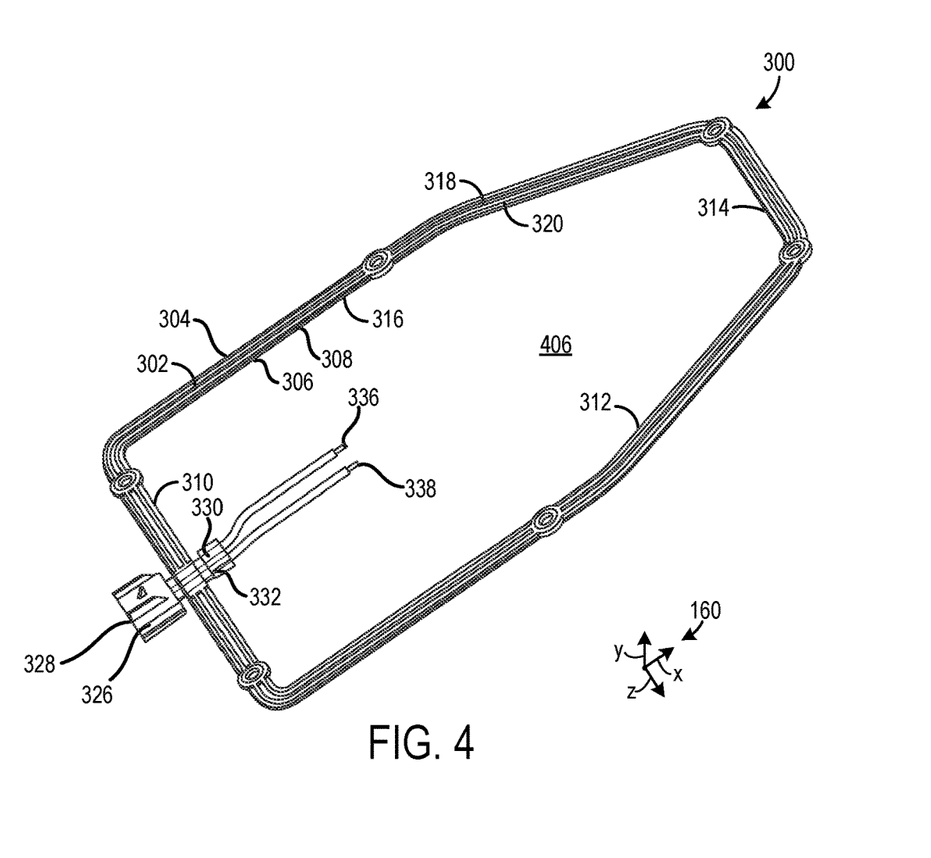
FIG. 4 is a perspective view of the gasket with integral pass-through electrical connections shown in FIG. 3.
Figure 5:
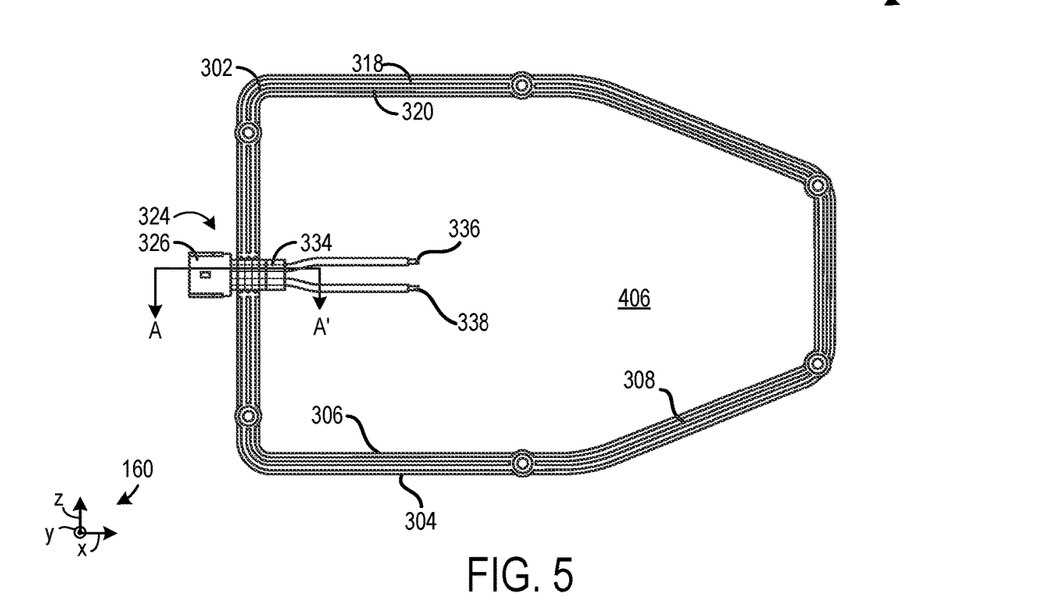
FIG. 5 is a top plan view of the gasket with integral pass-through electrical connections shown in FIG. 3.
Figure 6:
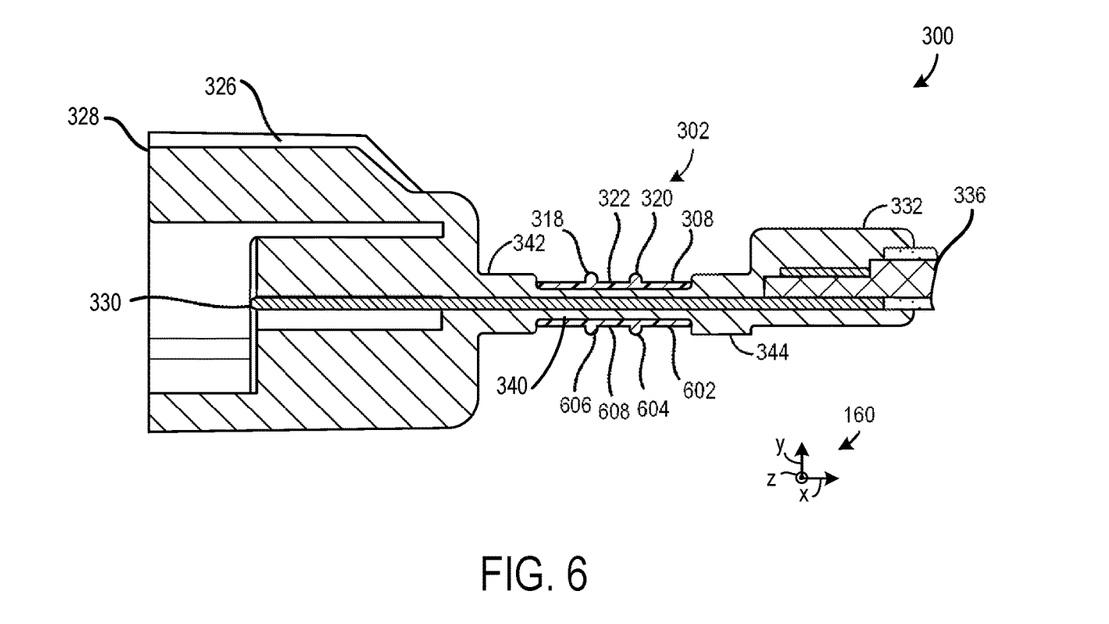
FIG. 6 is a magnified cross-sectional view of the gasket with integral pass-through electrical connections shown in FIG. 5.

Various aspects and embodiments of a gasket 300 having an integral pass-through electrical connection are illustrated in FIGS. 3-6. For example, FIGS. 3 and 4 provide perspective views of the gasket 300 with integral pass-through electrical connections, according to various embodiments. FIG. 5 is a top plan view of the gasket with integral pass-through electrical connections shown in FIG. 3. FIG. 6 is a cross-section view of a portion of the gasket shown in FIGS. 3-5, with the cross-section taken across line A-A' in FIG. 5. Gasket 300 is a non-limiting example of gasket 212, and thus may be included in an assembly to seal a joint between a cover of the assembly and one or more components/housings of the assembly, such as sealing a joint between the cover 202 and coolant manifold 214 as described above.

The gasket 300, as shown, comprises an elastomeric molded or formed main body 302, extending width-wise between an outer edge 304 and an inner edge 306 and including a top surface 308 and a bottom surface 602 (shown in FIG. 6). The main body 302 extends continuously to form a perimeter that circumscribes an interior area 406. The interior area 406 may be sized and configured to circumscribe the surface area of the heat transfer surface 154 of the coolant manifold 214 occupied by the heating element or electrical component 106, in examples where the gasket 300 is incorporated into the electric vehicle battery coolant heater assembly 200. As shown, the gasket 300 is generally rectangular, with the perimeter formed by the main body 302 defined in part by the inner edge 306. For example, the inner edge 306 may include a first side 310 extending along the z axis of the coordinate system 160, a second side 312 extending at least partially along the x axis, a third side 314 extending along the z axis, and a fourth side 316 extending at least partially along the x axis. As shown, the first side 310 may be longer than the third side 314 such that the second side 312 and the fourth side 316 may each include a straight portion that extends along the x axis and a tapered portion that tapers toward respective ends of the third side 314.

Main body 302 may have an equal width (e.g., from the inner edge 306 to the outer edge 304) along an entirety of the main body 302. Further, the main body 302 may have a suitable height (e.g., from the top surface 308 to the bottom surface 602) that is equal across the entirety of the main body 302, except, in some examples, at region where the gasket 300 includes a molded-in harness connector including electrical connectors that extend through the main body 302 (described below). However, other gasket shapes are possible without departing from the scope of this disclosure.

As shown in FIG. 6, the main body 302 may include two sets of parallel ridges that extend outward from the top surface 308 and the bottom surface 602. The top surface 308 may include a first ridge 318 and a second ridge 320 and the bottom surface 602 may include a third ridge 604 and a fourth ridge 606. The first and second ridges extend in parallel along an entirety of the top surface 308 of the main body 302, and thus define an upper channel region 322 therebetween. Likewise, the third and fourth ridges extend in parallel along an entirety of the bottom surface 602 of the main body 302, and thus define a lower channel region 608 therebetween. In some examples, the upper channel region 322 may be sized (e.g., having a width and depth) to accommodate a corresponding mating feature on a component mounting/attachment substrate (e.g., the cover as described above). In other examples, the upper channel region 322 may be configured to accommodate a sealing bead or other suitable structure. Similarly, in some examples, the lower channel region 608 may be sized (e.g., having a width and depth) to accommodate a corresponding mating feature on a correspondingly sized substrate gasket mounting surface of a component mounting/attachment substrate (e.g., the coolant manifold as described above). In other examples, the lower channel region 608 may be configured to accommodate a sealing bead or other suitable structure.

The main body 302 may be comprised of molded or formed elastomer, for example, natural rubber (NR), synthetic rubber (SR), styrene-butadiene rubber (SBR), thermoplastic elastomers (TPE), silicone, or other suitable elastic materials. By forming the gasket 300 with an elastomeric material, the gasket 300 may provide sufficient sealing while having a smaller form factor (e.g., smaller depth) than a gasket comprised of a rigid material such as plastic.

In some examples, the gasket 300 may include one or more compression limiters, such as compression limiter 325. The compression limiters may comprise regions of rigid material fully or partially embedded in the main body 302. The compression limiters, when included, may restrict the amount of vertical compression (e.g., compression in the y axis, where the y axis is parallel to gravity and is perpendicular to the ground on which the electric vehicle sits when the electric vehicle is positioned on flat ground) that the gasket 300 is subject to when the gasket 300 is incorporated into an assembly as described. As shown, the gasket 300 includes six compression limiters, but the gasket may include more or fewer compression limiters without departing from the scope of this disclosure, including no compression limiters.

The gasket 300 further includes an integrated electrical connector 324 including a molded-in harness mating connector shroud 326. The molded-in harness mating connector shroud 326 extends outward from the outer edge 304 of the main body 302 to an outward most edge 328 of the connector shroud 326. Protected within the connector shroud 326, as shown, are electrical conductors 330 and 332 which extend through the main body 302 of the gasket into an interior connector 334. Interior connector 334 may provide an interface for transitioning the (flat metal) electrical conductor structure of electrical conductors 330 and 332 to a different type, in this case, as illustrated, to solid (round) wire conductors 336 and 338. The solid wire or wire wrap type internal electrical conductors may be used, for example, where the heating element or electrical component requiring electrical connection within the to-be-sealed enclosure requires connection with such sold type wire. The integrated electrical connector thus is configured to provide power or electric signals to at least one electrical component of the assembly.

Further, as shown in FIG. 6, the integrated electrical connector 324 includes a bridge 340. The bridge 340 may comprise a region of reduced height between the connector shroud 326 and the interior connector 334. At the bridge 340, the integrated electrical connector 324 may pass through the main body 302. In this way, at the bridge 340, the integrated electrical connector 324 includes the electrical conductors 330 and 332 encased in a relatively thin top layer and bottom layer of a more rigid, plastic material, with the more flexible elastomeric gasket main body 302 extending over the top and bottom of the bridge 340. By separating the shroud 326 and the interior connector 334 by the bridge 340, the integrated electrical connector 324 may pass through the main body of the gasket without increasing a height of the gasket or compromising gasket sealing efficiency or stability. As appreciated by FIG. 6, the thickness of the integrated electrical connector 324 may be smallest at the bridge 340, and the bridge 340 may be adjoined by two regions of increased thickness, a first adjoining region 342 and a second adjoining region 344. The combination of the first adjoining region 342, the bridge 340, and the second adjoining region 344 may create a top indentation and a bottom indentation within each of which the main body 302 of the gasket 300 may extend. As shown, the outer edge 304 of the main body 302 may be in face-sharing contact with the first adjoining region 342 (along both the top portion of the main body and the bottom portion of the main body) and the inner edge 306 of the main body 302 may be in face-sharing contact with the second adjoining region 344 (along both the top portion of the main body and the bottom portion of the main body). In doing so, the sealing efficiency of the gasket 300 may be maintained across the region where the integrated electrical connector 324 passes through the gasket.

The connector shroud 326, the bridge 340, the first adjoining region 342, the second adjoining region 344, and interior connector 332 may be comprised of a suitable material, such as nylon 66, another plastic, or other insulating material.

Other types of electrical connectors and conductors may be used. For example, the molded-in connector 326 is shown and described as a connector shroud within which flat metal electrical conductors extend outward away from the gasket. However, in other embodiments, not shown, the molded-in connector shroud may comprise a connector shroud structure (and electrical conductor configuration) defined by customer harness connection requirements. For example, the molded-in shroud may comprise molded-in key notch structure, material thickness, electrical conductor width and thickness, etc., as defined by a particular customer's harness connection requirements. Likewise, configurations for electrical connection of the heating element or electrical component within the to-be-sealed enclosure may comprise spade type pins (such as the male spade (blade) terminals 222 and 224 shown in FIG. 2, and the female spade (double crimp) terminals 220 and 218 shown in FIG. 2), solid wire conductors, stranded wire conductors, insulated splice type connectors, forked connectors, ring terminals, or other types of connectors.

The present inventors determined that a component cover such as the cover 202 in the assembly described with respect to FIG. 2 provides a battery coolant heater assembly that has significantly reduced packaging size requirements (due to the significantly height reduced cover). The present inventors determined such a design improves manufacturability of the component assembly by allowing full access to complete the electrical hookups before the cover is installed. The present inventors further determined that the design removes a secondary leak path (by eliminating the through hole in the cover and integrating the electrical connector into the sealing gasket between the cover and the coolant manifold), and reduces the number of required components (by eliminating the separate harness connector and gasket and additional wiring lengths associate therewith).

Thus, disclosure is provided herein for a non-rigid gasket including integrated electrical circuitry so that current and/or signal may pass directly through the gasket. The gasket may be used to seal certain components, such as battery components, and the gasket as described herein removes the need for secondary electrical plugs to pass through the sealed component compartment. The gasket as described herein allows the component cover to be of shorter packaging size and allows all wiring hookups to the electrical component to be made before installation of the cover.

The technical effect of integrating an electrical connector into an elastomeric gasket is that the cover of an assembly, such as the battery coolant heater assembly as described herein, may be reconfigured to eliminate the separate harness connector and structures due to the inclusion of the harness connector and structures in the gasket, resulting in a reduced size assembly (requiring less (cover) material) having fewer required components, an easier to manufacture assembly (requiring less and simplified labor for manufacturing/assembling the unit) (i.e., simplified/improved manufacturability), and an assembly having fewer potential leak points (due to elimination of the need for through hole in the cover and a separate harness connector).

The disclosure also provides support for a gasket with at least one integral electrical connector adapted for an assembly, the gasket comprising: an elastomeric gasket main body adapted to seal a joint between one or more assembly components and a cover, and an electrical connector extending through and formed integrally with the elastomeric gasket main body so as to provide power or electric signals to at least one electrical component of the assembly. In a first example of the gasket, the electrical connector includes a molded-in harness mating connector shroud, the molded-in harness mating connector shroud molded into an outside edge of the gasket main body so that the molded-in harness mating connector shroud is exposed outside of the assembly, and wherein at least one electrical conductor extends from the molded-in harness mating connector shroud and though the elastomeric gasket main body. In a second example of the gasket, optionally including the first example, the cover, due to the electrical connector extending through and formed integrally with the gasket main body, is free from any through hole sized and adapted to receive a non-gasket-integral electrical harness connector for providing power or electrical signals to the at least one electrical component, such that a depth of the cover is decreased by at least a portion of a depth-wise dimension of the non-gasket-integral electrical harness connector. In a third example of the gasket, optionally including one or both of the first and second examples, metallic pin circuitry extends between the at least one electrical conductor exposed and oriented within the molded-in harness mating connector shroud through the gasket main body so that one or more ends of the at least one electrical conductor opposite the connector shroud are positioned within a space circumscribed by the gasket main body, with the metallic pin circuitry adapted for providing electrical power or electrical signals to the at least one electrical component. In a fourth example of the gasket, optionally including one or more or each of the first through third examples, the at least one electrical conductor positioned within the space is adapted with a spade terminal connector for electrical connection with a correspondingly mating spade terminal connector of the at least one electrical component. In a fifth example of the gasket, optionally including one or more or each of the first through fourth examples, the at least one electrical conductor positioned within the space is adapted with a wire conductor for electrical connection with the at least one electrical component.

The disclosure also provides support for a gasket adapted for an assembly, the gasket comprising: a main body adapted to seal a joint between one or more assembly components and a cover, and an electrical connector extending through and formed integrally with the main body, the electrical connector comprising: a harness mating connector shroud, an interior connector, a bridge coupled between the connector shroud and the interior connector, and one or more electrical conductors extending from the connector shroud, through the bridge, and to the interior connector, the one or more electrical conductors configured to provide power or electric signals to at least one electrical component of the assembly. In a first example of the gasket, the electrical connector extends through the main body at the bridge. In a second example of the gasket, optionally including the first example, at the bridge, the one or more electrical conductors are encased in a top layer and a bottom layer each comprised of a plastic material, with the main body extending over the top layer and the bottom layer of the bridge, and wherein the main body is comprised of an elastomeric material. In a third example of the gasket, optionally including one or both of the first and second examples, a thickness of the electrical connector is smallest at the bridge. In a fourth example of the gasket, optionally including one or more or each of the first through third examples, the bridge is adjoined by a first adjoining region and a second adjoining region each having an increased thickness relative to the bridge, the first adjoining region, the bridge, and the second adjoining region forming a top indentation and a bottom indentation within each of which the main body extends. In a fifth example of the gasket, optionally including one or more or each of the first through fourth examples, an outer edge of the main body is in face-sharing contact with the first adjoining region and an inner edge of the main body is in face-sharing contact with the second adjoining region. In a sixth example of the gasket, optionally including one or more or each of the first through fifth examples, the one or more electrical conductors are adapted with spade terminal connectors for electrical connection with correspondingly mating spade terminal connectors of the at least one electrical component. In a seventh example of the gasket, optionally including one or more or each of the first through sixth examples, the one or more electrical conductors are adapted with wire conductors for electrical connection with the at least one electrical component.

The disclosure also provides support for a battery coolant heater assembly, comprising: a coolant manifold, a cover, and a gasket comprising a main body adapted to seal a joint between the coolant manifold and the cover, and an electrical connector extending through and formed integrally with the main body so as to provide power or electric signals to at least one electrical component of the battery coolant heater assembly via one or more electrical conductors. In a first example of the assembly, the gasket includes a molded-in harness mating connector shroud, the molded-in harness mating connector shroud molded into an outside edge of the main body so that the molded-in harness mating connector shroud is exposed outside of the assembly, and wherein the one or more electrical conductors extend from the molded-in harness mating connector shroud and though the elastomeric gasket main body. In a second example of the assembly, optionally including the first example, the electrical connector further includes an interior connector and a bridge coupled between the connector shroud and the interior connector, where the one or more electrical conductors extend from the connector shroud, through the bridge, and to the interior connector. In a third example of the assembly, optionally including one or both of the first and second examples, a thickness of the electrical connector is smallest at the bridge, and wherein the bridge is adjoined by a first adjoining region and a second adjoining region each having an increased thickness relative to the bridge, the first adjoining region, the bridge, and the second adjoining region forming a top indentation and a bottom indentation within each of which the main body extends. In a fourth example of the assembly, optionally including one or more or each of the first through third examples, an outer edge of the main body is in face-sharing contact with the first adjoining region and an inner edge of the main body is in face-sharing contact with the second adjoining region. In a fifth example of the assembly, optionally including one or more or each of the first through fourth examples, the one or more electrical conductors are adapted with spade terminal connectors for electrical connection with correspondingly mating spade terminal connectors of the at least one electrical component, or the one or more electrical conductors are adapted with wire conductors for electrical connection with the at least one electrical component.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Certain adaptations and modifications of the described embodiments can be made. Therefore, the above discussed embodiments are considered to be illustrative and not restrictive. The present disclosure is not to be limited in scope by the specific embodiments described herein. Further example embodiments may also include all of the steps, features, compositions and compounds referred to or indicated in this description, individually or collectively and any and all combinations or any two or more of the steps or features.

Throughout this document, the use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more. The words "comprising" (and any form of comprising, such as "comprise' and comprises), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", "forward", "backward", "back", "rear", "upwardly", "downwardly", etc. is used. It is to be understood that such terminology is used for ease of description and in a relative sense only and is not to be taken in any way as specifying an absolute direction or orientation.

The embodiments described herein may include one or more range of values (for example, size, displacement and field strength etc.). A range of values will be understood to include all values within the range, including the values defining the range, and values adjacent to the range that lead to the same or substantially the same outcome as the values immediately adjacent to that value which defines the boundary to the range. For example, a person skilled in the field will understand that a 10% variation in upper or lower limits of a range can be totally appropriate and is encompassed by the disclosure. More particularly, the variation in upper or lower limits of a range will be 5% or as is commonly recognized in the art, whichever is greater.

Throughout this specification relative language such as the words 'about' and 'approximately' are used. This language seeks to incorporate at least 10% variability to the specified number or range. That variability may be plus 10% or negative 10% of the particular number specified.

The invention claimed is:

1. A battery coolant heater assembly, comprising:
   a coolant manifold;
   a cover; and
   a gasket comprising a main body adapted to seal a joint between the coolant manifold and the cover, and an electrical connector extending through and formed integrally with the main body so as to provide power or electric signals to at least one electrical component of the battery coolant heater assembly via one or more electrical conductors, wherein the gasket includes a molded-in harness mating connector shroud, the molded-in harness mating connector shroud molded into an outside edge of the main body so that the molded-in harness mating connector shroud is exposed outside of the battery coolant heater assembly, and wherein the one or more electrical conductors extend from the molded-in harness mating connector shroud and through the main body.

2. The assembly of claim 1, wherein the electrical connector further includes an interior connector and a bridge coupled between the molded-in harness mating connector shroud and the interior connector, where the
one or more electrical conductors extend from the molded-in harness mating connector shroud, through the bridge, and to the interior connector.

3. The assembly of claim 2, wherein a thickness of the electrical connector is smallest at the bridge, and wherein the bridge is adjoined by a first adjoining region and a second adjoining region each having an increased thickness relative to the bridge, the first adjoining region, the bridge, and the second adjoining region forming a top indentation and a bottom indentation within each of which the main body extends.

4. The assembly of claim 3, wherein an outer edge of the main body is in face-sharing contact with the first adjoining region and an inner edge of the main body is in face-sharing contact with the second adjoining region.

5. The assembly of claim 1, wherein the one or more electrical conductors are adapted with spade terminal connectors for electrical connection with correspondingly mating spade terminal connectors of the at least one electrical component, or the one or more electrical conductors are adapted with wire conductors for electrical connection with the at least one electrical component.

6. A battery coolant heater assembly, comprising:
a coolant manifold;
a cover; and
a gasket comprising a main body adapted to seal a joint between the coolant manifold and the cover, and an electrical connector formed integrally with the main body, wherein the electrical connector extends from outside of an interior area defined at least in part by an inner edge of the main body, through the main body, and beyond the inner edge of the main body into the interior area so as to provide power or electric signals to at least one electrical component of the battery coolant heater assembly via one or more electrical conductors.

7. The battery coolant heater assembly of claim 6, wherein the one or more electrical conductors are adapted with a wire conductor for electrical connection with the at least one electrical component positioned within a space sealably enclosed between the cover and the coolant manifold.

8. The battery coolant heater assembly of claim 6, wherein a metallic pin circuitry extends between the one or more electrical conductors through the main body so that one or more ends of the one or more electrical conductors are positioned within a space sealably enclosed between the cover and the coolant manifold, with the metallic pin circuitry adapted to provide electrical power or electrical signals to the at least one electrical component positioned within the space.

9. The battery coolant heater assembly of claim 6, wherein the cover is free from any through hole sized and adapted to receive a non-gasket-integral electrical harness connector for providing power or electrical signals to the at least one electrical component, such that a depth of the cover is decreased by at least a portion of a depth-wise dimension of the non-gasket-integral electrical harness connector.

10. The battery coolant heater assembly of claim 6, wherein the electrical connector comprises a harness mating connector shroud outside of a space sealably enclosed by the cover and the coolant manifold, an interior connector inside the space, and a bridge coupled between the harness mating connector shroud and the interior connector, and wherein the one or more electrical conductors extend through the harness mating connector shroud, the bridge, and the interior connector.

11. The battery coolant heater assembly of claim 10, wherein the bridge encases the one or more electrical conductors with a top layer and a bottom layer, and wherein the main body extends over the top layer and the bottom layer such that the one or more electrical conductors extend through the bridge and the main body into the space without increasing a height of the gasket.

12. The battery coolant heater assembly of claim 10, wherein the harness mating connector shroud is molded into an outside edge of the main body so that the harness mating connector shroud is exposed outside of the battery coolant heater assembly and the electrical conductors are protected within the harness mating connector shroud.

13. The battery coolant heater assembly of claim 10, wherein the interior connector extends into the interior area from the inner edge, and is inside the battery coolant heater assembly.

14. The battery coolant heater assembly of claim 10, wherein the one or more electrical conductors are configured in a flat shape in the bridge, and wherein the interior connector is adapted to transition the one or more electrical conductors from the flat shape to a shape conducive to connection with the at least one electrical component.

15. The battery coolant heater assembly of claim 10, wherein a thickness of the electrical connector is smallest at the bridge and a height of the main body is approximately equal across an entirety of the main body.

16. The battery coolant heater assembly of claim 6, wherein the coolant manifold comprises a substantially planar heat transfer surface, and wherein the interior area is sized and configured to circumscribe a surface area of the substantially planar heat transfer surface.

17. The battery coolant heater assembly of claim 16, wherein the at least one electrical component comprises at least one heating element adapted to contact and thermally couple to the substantially planar heat transfer surface.

18. The battery coolant heater assembly of claim 6, wherein the main body is comprised of an elastomeric material and the electrical connector is comprised of a rigid plastic material.

* * * * *